United States Patent [19]
Garner et al.

[11] Patent Number: 5,109,514
[45] Date of Patent: Apr. 28, 1992

[54] METHOD AND APPARATUS FOR EXECUTING CONCURRENT CO PROCESSOR OPERATIONS AND PRECISELY HANDLING RELATED EXCEPTIONS

[75] Inventors: Robert B. Garner, San Jose; Kwang G. Tan, Mountain View; Donald C. Jackson, Cupertino, all of Calif.

[73] Assignee: Sun Microsystems, Inc., Mountain View

[21] Appl. No.: 561,275

[22] Filed: Aug. 1, 1990

Related U.S. Application Data

[63] Continuation of Ser. No. 225,187, Jul. 28, 1988, abandoned.

[51] Int. Cl.⁵ .......................... G06F 15/16; G06F 9/38
[52] U.S. Cl. ...................................... 395/125; 395/800; 364/DIG. 1; 364/228; 364/228.6; 364/231.8; 364/263
[58] Field of Search ... 364/200 MS File, 900 MS File; 371/12

[56] References Cited

U.S. PATENT DOCUMENTS

| | | | |
|---|---|---|---|
| 4,564,901 | 1/1986 | Tomlinson et al. | 364/200 |
| 4,598,356 | 7/1986 | Dean et al. | 364/200 |
| 4,648,034 | 3/1987 | Heninger | 364/200 |
| 4,715,013 | 12/1987 | McGregor et al. | 364/900 |
| 4,729,094 | 3/1988 | Zolnowsky et al. | 364/200 |
| 4,750,110 | 6/1988 | Mothersole et al. | 364/200 |
| 4,758,950 | 7/1988 | Cruess et al. | 364/200 |
| 4,758,978 | 7/1988 | Cruess et al. | 364/900 |
| 4,821,231 | 4/1989 | Cruess et al. | 364/900 |
| 4,914,578 | 4/1990 | McGregor et al. | 364/200 |
| 4,949,241 | 8/1990 | Iwasaki et al. | 364/200 |
| 4,994,961 | 2/1991 | MacGregor et al. | 364/200 |
| 5,021,991 | 6/1991 | McGregor et al. | 364/900 |

Primary Examiner—Michael R. Fleming
Assistant Examiner—Gopal C. Ray
Attorney, Agent, or Firm—Blakely Sokoloff Taylor & Zafman

[57] ABSTRACT

A computer system which includes a central processing unit including a first processing unit that performs basic processing functions and a co-processing unit that performs multiple specialized processing functions concurrently with the first processing unit, an arrangement for detecting the occurrence of a function causing an exception in a result produced by the coprocessing unit, an arrangement for specifying to the first processing unit any exception in a result produced by the coprocessing unit, an arrangement for using the first processing unit to implement any function which causes an exception in a result produced by the co-processing unit, an arrangement for storing the identification of the instruction being handled by the first processing unit when a function causing any exception in a result produced by the co-processing unit occurs, and an arrangement for determing the instruction which produced the exception.

15 Claims, 4 Drawing Sheets

METHOD AND APPARATUS FOR EXECUTING CONCURRENT CO PROCESSOR OPERATIONS AND PRECISELY HANDLING RELATED EXCEPTIONS

This is a continuation of application Ser. No. 07/225,187 filed Jul. 28, 1988 now abandoned.

BACKGROUND OF THE INVENTION

The present invention relates to the design of central processing and co-processing units in computers, and, more particularly, to apparatus and methods for precisely recording and handling exceptions generated by co-processors that can execute instructions concurrently with a central processor.

HISTORY OF THE PRIOR ART

A computer typically comprises a central processing unit, a memory unit, input/output controllers, and input/output devices. A central control unit in the central processing unit typically fetches and executes instructions from the memory unit. The instructions, together with the registers they operate upon in the central control unit, define the primary instruction-set architecture of the central processing unit.

In order to extend a primary instruction-set architecture, the architecture can have special provisions for co-processors. A co-processor can execute instructions that are specific to the particular co-processor and its own register set.

There are several ways to arrange for the execution of co-processor instructions. In particular, they can execute either (1) "between" instructions executed by the central control unit, or (2) concurrently with instructions executed by the central control unit. In the case in which co-processor instructions execute "between" instructions executed by the central control unit, the central control unit is stalled until the co-processor finishes the operation input by the co-processor instruction.

In the case in which co-processor instructions execute concurrently with instructions executed by the central control unit, the co-processor can either (a) execute only one co-processor instruction concurrently with central control unit, or (b) can execute multiple co-processor instructions concurrently with the central control unit.

When a co-processor executes or attempts to execute a co-processor instruction, that instruction may generate errors or may not be a legal or defined co-processor instruction. For example, the co-processor may not completely implement all possible functions of which a co-processor might normally be capable because the cost of those capabilities is too great in terms of system speed. Moreover, certain mathematical manipulations by a co-processor may reach results which are in error such as division by zero. When one of these functions is encountered by the co-processor, the co-processor must signal the exception to the central control unit. The exception causes the central control unit to change its flow of control to a special trap address reserved for the exception. When the exception has been processed by special trap software, the central control unit resumes execution where the exception occurred.

Historically, most co-processor to central control unit interfaces have been of those which either execute co-processor instructions between central control unit instructions or which execute a single co-processor instruction concurrently with the central control unit instruction. In the first situation, since the exception occurs between central control unit instructions, the trap software can return to the address that the central control unit's program counter had at the time of the exception and a single register in the co-processor can precisely identify the co-processor instruction that generated the exception and the type of exception. In the second situation, since only one co-processor operation can be outstanding at any one time, again the trap software can return to the address that the central control unit's program counter had at the time of the exception and a single register in the co-processor can precisely identify the co-processor instruction that generated the exception and the type of exception.

Historically, computers with co-processors of these two types support what is commonly called "precise" central processing unit interrupts. On the other hand, computers in which the co-processors are capable of handling multiple co-processor instructions concurrently with the central control unit, including computers with pipelined floating-point co-processor units, provide for only "imprecise" co-processor exceptions in which the special trap software is unable to locate the co-processor instruction that generated the exception.

This patent describes a co-processor interface and the apparatus necessary so that the trap software can precisely identify the co-processor instructions that generated exceptions or were not completed when an exception was generated and thereby allow the central control unit to resume program execution after a co-processor exception.

SUMMARY OF THE INVENTION

It is, therefore, an object of the present invention to provide an architecture for general-purpose co-processors that are able to execute multiple co-processor instructions in parallel with the central processing unit but which allows for the precise identification of co-processor instructions that generate exceptions.

It is another, more general, object of the present invention to provide an architecture for handling those functions of a co-processor which provide erroneous results or have not been implemented in the hardware of the co-processor.

It is an additional, more general, object of the invention to provided an arrangement for utilizing co-processors without requiring that all of the functions normal to those co-processors be implemented in hardware.

These and other objects are accomplished in accordance with the invention by a computer architecture which includes a central processing unit including central control unit that performs basic processing functions and a co-processing unit that performs specialized functions, and an arrangement causing the central control unit to load and store operations for the co-processor unit. The architecture is designed to detect the occurrence of a function not implemented by the co-processor or of a function which has or will produce an erroneous output, to specify to the central control unit the particular function not implemented by the co-processor or erroneously handled by the co-processor, to specify to the central control unit any other unfinished co-processor instructions that did not or should not complete execution when an instruction generates an exception, to implement the function not implemented by the co-processor by means of the central

NOTATION AND NOMENCLATURE

The detailed descriptions which follow are presented to a degree in terms of algorithms and symbolic representations of operations on data bits within a computer memory. These algorithmic descriptions and representations are the means used by those skilled in the data processing arts to most effectively convey the substance of their work to others skilled in the art.

An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary or desirable in most cases in any of the operations described herein which form part of the present invention; the operations are machine operations. Useful machines for performing the operations of the present invention include general purpose digital computers including reduced instruction set computer signal processors or other similar devices. In all cases the distinction between the method operations in operating a computer and the method of computation itself should be borne in mind. The present invention relates, in part, to method steps for operating a computer in processing electrical or other (e.g. mechanical, chemical) physical signals to generate other desired physical signals.

The present invention also relates to apparatus for performing these operations. This apparatus may be specially constructed for the required purposes or it may comprise a general purpose computer as selectively activated or reconfigured by a computer program stored in the computer. Any algorithms presented herein are not inherently related to any particular computer or other apparatus. In particular, various general purpose machines may be used with programs written in accordance with the teachings herein, or it may prove more convenient to construct more specialized apparatus to perform the required method steps. The required structure for a variety of these machines will appear from the description given below.

DETAILED DESCRIPTION

General System Configuration

Figure 1:
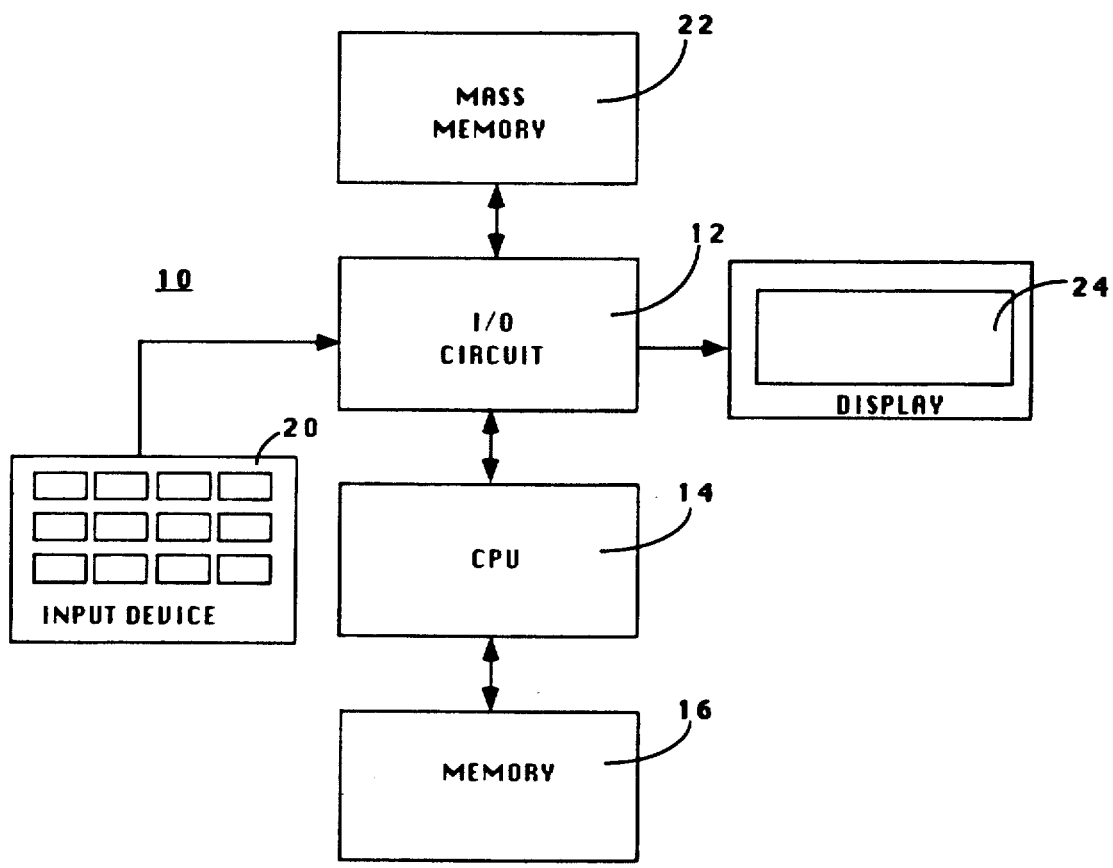
FIG. 1 illustrates in block diagram form a generalized computer system which may utilize the invention.

FIG. 1 shows a typical computer-based system according to the present invention. Shown is a computer 10 which comprises an input/output circuit 12 used to communicate information in appropriately structured form to and from the other parts of computer 10 and associated equipment, a central processing unit 14, and a memory 16. These components are those typically found in most general and special purpose computers; and the several elements contained within computer 10 are intended to be representative of this broad category of data processors.

FIG. 1 also illustrates an input device 20 shown as a keyboard. It should be understood, however, that the input device 20 may actually be a transducer card reader, a magnetic or paper tape reader, or some other well-known input device such as, of course, another computer. A mass memory device 22 is coupled to the input/output circuit 12 and provides additional storage capability for the computer 10. The mass memory device 22 may be used to store programs, data, and the like and may take the form of a magnetic or paper tape reader or some other well known device. It will be appreciated that the information retained within the mass memory device 22, may, in appropriate cases, be incorporated in standard fashion into computer 10 as part of the memory 16.

In addition, a display monitor 24 is illustrated which is used to display the images being generated by the present invention. Such a display monitor 24 may take the form of any of several well-known varieties of cathode ray tube displays or some other well known type of display.

As is well known, the memory 16 may store programs which represent a variety of sequences of instructions for execution by the central processing unit 14. For example, the control program for implementing the operations and routines described herein to monitor and control programs, disk operating systems, and the like may be stored within the memory 16.

It should, of course, be understood by those skilled in the art that the invention may be practiced by the use of a special purpose digital computer as well as the general purpose computer illustrated in FIG. 1.

Figure 2:
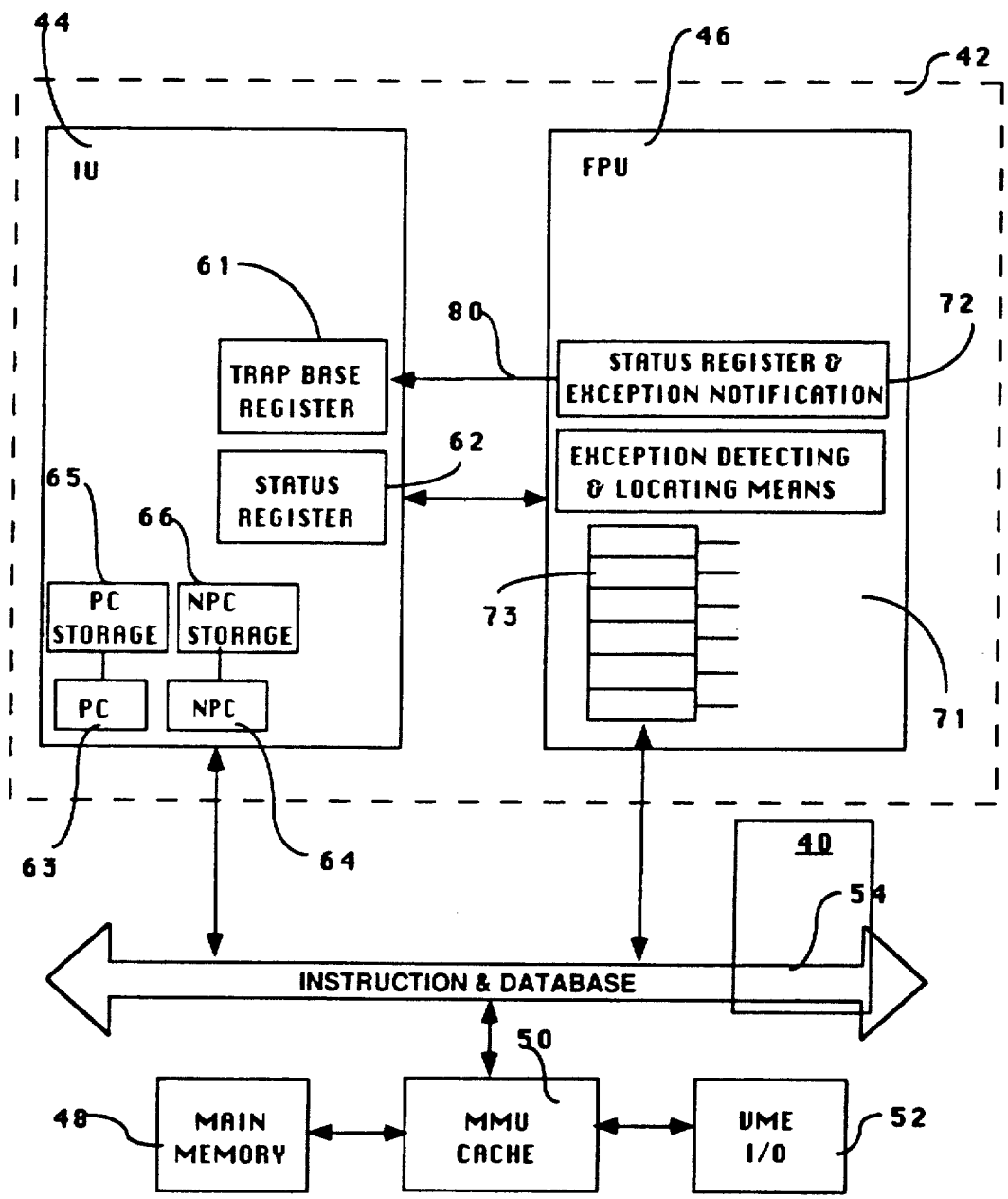
FIG. 2 illustrates in block diagram form a generalized RISC computer system which may utilize the invention.

FIG. 2 illustrates in block diagram form a type of computer called a reduced instruction set computer or RISC machine which may be utilized in carrying out the preferred embodiment of the present invention. RISC machines are designed for hardware simplicity and are designed to eliminate from hardware those functions which are complicated and infrequently used. RISC machines tend to maximize the effective speed of computation by performing infrequently executed functions by means of software. An example of a RISC machine is the Sun-4/200 series of computers manufactured by Sun Microsystems, Inc., 2550 Garcia Avenue, Mountain View, Calif. The computers of the Sun-4/200 series utilize an architecture including a co-processor unit which is capable of executing several co-processor instructions concurrently with the central control unit and will therefore be used for the purpose of describing the present invention. More details of the architecture and operation of the Sun-4/200 series of computers may be gained from *The SPARC Architecture Manual*, Version 7, published by Sun Microsystems, Inc.

Shown in FIG. 2 is a computer 40 which comprises a central processing unit 42 including an integer unit 44 that performs basic processing functions and a co-processing unit 46 that performs specialized functions, a main memory 48, a memory management unit and a cache for instructions and data 50, an input/output subsystem including a general purpose VME input/output bus 52, and a data and instruction bus 54. These components are those found in the Sun Microsystems 4/200 series of reduced instruction set computers; and the several elements contained within computer 40 are intended to be representative of this category of computer. In the Sun Microsystems 4/200 RISC computers, the central control unit is referred to as the integer unit and that nomenclature is utilized in this description. Moreover, the most usual co-processor unit 46 is a floating-point co-processor: and in this discussion the co-processing unit is referred to hereafter as the floating-point unit 46. Other computers having the capabilities of general and special purpose computers may, of course, be adapted to perform the several functions described below.

The preferred embodiment of the integer unit 44 includes a number of registers capable of handling 32 bits of information. The integer unit 44 includes two types of registers, working registers and control/status registers. The working registers of the integer unit 44 are used for normal operations and the control status registers keep track of and control the state of the integer unit 44.

Among the status/control registers of the integer unit 44 is a processor status register 61. The integer unit 44 also includes a trap base register 62 which responds to particular trap exception signal 80 generated to provide the address of the particular trap handler to be used when a trap occurs. The integer unit 44 also includes a program counter register 63 and a next program counter register 64 which, respectively, hold the address of the instruction being executed and the address of the next instruction to be executed. The program counter register 63 is utilized to order the operation of the instructions in the integer unit 44.

The floating point unit 46 also includes a large number of registers. The floating point unit 46 has thirty-two working registers 71 and two control/status registers, a floating point status register 72 and a floating-point queue register 73. The working registers 71 of the floating-point unit 46 allow a number of arithmetic operations to be conducted concurrently. For example, a number of registers may be involved in an add operation while at the same time a second number of registers are involved in a multiply operation.

The computer 40 of FIG. 2 functions as follows. The integer unit 44 is the basic processor of the system; it executes all of the instructions of the system except for those of the floating point unit 46 which executes floating point arithmetic in a manner well known to the prior art. The integer unit 44 receives instructions on the instruction and data bus 54 in an instruction stream.

Normally, these instructions are executed in sequence under control of the program counter in the integer unit 44. However, instructions which are to be executed by the floating-point unit 46 (or other co-processor unit) contain bits which indicate that they are to be transferred to the floating-point unit for execution. The integer unit processor status register 61 stores information regarding, among other things, whether a floating point unit 46 is present in the particular implementation of the system and whether the particular process being implemented uses the floating point unit 46 if one is present. With each step of the operation, the integer unit processor status register 61 is checked; if it indicates that no floating point unit 46 is present or that the floating point unit 46 though present is disabled, then the integer unit 44 is caused to seek instructions emulating the particular function in the software of the operating program. This is accomplished by reference to the trap base register 62 which selects from memory the software for causing the particular function to be implemented.

Figure 3:
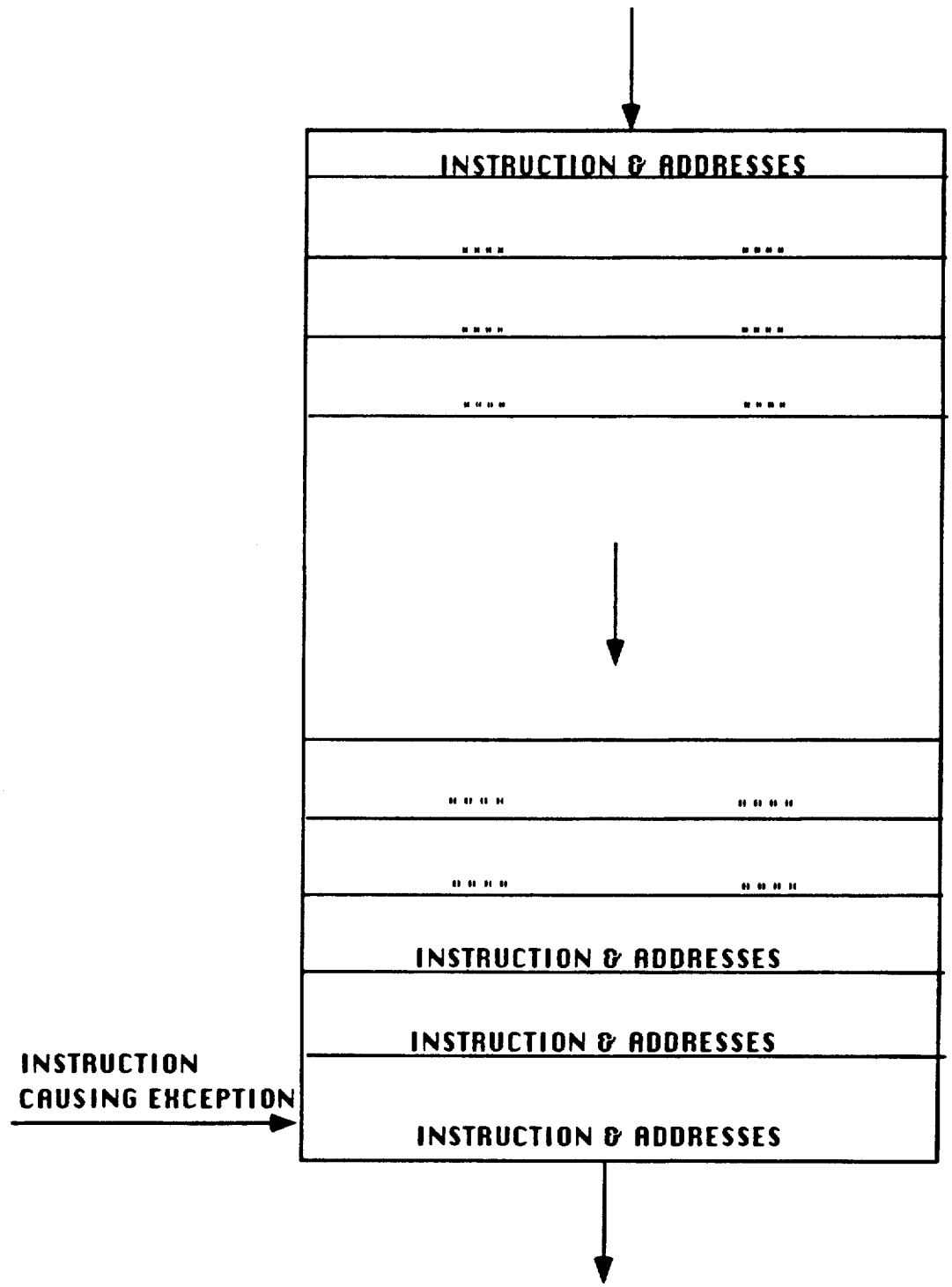
FIG. 3 illustrates in block diagram form a queue of instructions for operating a co-processor in accordance with the invention.

If a floating-point unit 46 is present and enabled, the integer unit 44 extracts floating-point instructions from the instruction stream and places them in a queue 73 for the floating-point unit 46. FIG. 3 illustrates in block diagram form a queue of instructions for operating the floating-point unit 46. The queue of FIG. 3 may be implemented in a manner well known to the prior art by physical registers within the floating-point unit 46 or by buffer or other memory within the computer system 40. In the preferred embodiment shown in FIG. 2, physical registers in the floating-point unit 46 are utilized.

The floating-point queue 73 records the floating-point instructions and their addresses in the order they are received. When the transfer occurs and the floating-point unit 46 begins operation on an instruction, the integer unit 44 and the floating-point unit 46 are operating on program instructions concurrently. This facility substantially increases the speed of operation of the system 40.

Moreover, as mentioned above, the floating-point unit 46 has a number of arithmetic units 71 which are capable of executing in parallel. The floating-point queue 73 contains at least one register for each of the floating-point arithmetic units 71 capable of operating in parallel with other arithmetic units. Floating-point instructions are executed from the queue 73 when the specified floating-point arithmetic unit for the particular floating-point queue register is available. Quite obviously, this facility may also substantially increases the speed of operation of the system 40.

The program counter 63 of the integer unit 44 causes each operation to occur at its appropriate time. Sometimes this requires that the integer unit 44 halt in its operation; for example, if the next step in an operation requires the result of a floating point operation which must be stored in memory and which has not yet been completed, then the integer unit 44 halts and waits for the floating point unit 46 to complete the operation and provide the particular result before it proceeds.

However, since the integer unit 44 and the floating-point unit 46 are operating concurrently and the floating-point unit 46 may be processing parallel instructions, if the floating-point unit 46 encounters an error condition either because the particular function is not implemented in the floating-point unit 46 or for some other reason, it is necessary to remove the instruction which caused the error from the floating-point unit 46 and any other instructions that may have been executing at the time of the error and implement those functions in software using the integer unit 44. Since the integer unit 44 and the floating-point unit 46 may be operating on instructions which are not synchronous, prior art systems have had great difficulty in determining the instruction which caused the exception.

In general, this is accomplished in the system 40 by the generation of an exception signal 80 upon the occurrence of the exception which cannot be implemented or is erroneously carried out by the floating-point unit 46. The exception signal 80 is trapped and causes the queue 73 of the floating-point unit 46 to stop in place and the integer unit 44 to halt its normal operation and enter a trap mode. The floating-point unit 46 then determines which step of the queue 73 caused the occurrence of the exception by looking at the head of the queue and from that determines the particular floating-point operation which was being attempted. This information is referred to the trap base register of the 62 integer unit 44; the trap base register 62 looks to the program software for an emulation of the particular step which caused the floating-point unit 46 to register an exception and runs that emulation with the data involved. The trap base register 62 of the integer unit 44 also runs each of the other instructions in the queue 73 of the floating-point unit 46 until the queue 73 is empty.

Once the instruction causing the floating point unit 46 exception and the other instructions in the 73 queue have been run, the integer unit 44 causes the program to restart at the program counter position the point where the exception occurred.

Obviously, the operating system must be capable of emulating the entire floating point unit 46 in order to properly handle the unimplemented and unfinished exceptions generated by the floating point unit 46 error exceptions.

The following discussion describes in more detail the operation of the system 40 described generally above.

The floating-point status register 72 stores information regarding each instruction to be executed by the floating point unit 46. The floating-point status register 72 also stores, in the preferred embodiment five bits of information which may be used to indicate floating point exceptions which cause traps to be generated. The floating-point status register 72 also includes three bits which identify the type of exception or error. Of these, the ones of import to this discussion are that no trap is to be generated, that the operation is unable to produce the correct result, that the operation is not implemented by the floating point unit 46, and exceptions delineated in the ANSI/IEEE 754-1985 standard. The first type of trap obviously causes the floating point unit 46 to continue running in its normal manner. The latter types of traps are those which cause the integer unit 44 to go to the program for an emulation of the particular floating point unit 46 operation or to cause the floating point unit 46 to re-execute the particular operation.

The floating-point status register 72 also includes one bit which indicates the state of the floating point queue 73 after a floating point exception has been executed. This bit indicates whether the queue 73 is empty or not and is used by the trap software, executing on integer unit 44 to determine when all instructions in the floating point queue 73 have been read and executed after an exception has occurred.

As pointed out above, the floating point queue 73 register keeps track of the instructions being executed. The floating-point queue register 73 among other things keeps track of the main memory address of each instruction being executed and to be executed and thus allows the exception position to be identified.

The trap base register of the integer unit 44 selects information from memory by use of a table. The trap base register 62 contains fields which generate the address for the particular trap handler software when a trap occurs. These include a base trap address and an offset address for the particular type of trap. The program counter register 63 contains the address of the instruction presently being executed by the integer unit 44 while the next program counter 64 holds the address of the next instruction to be executed. When a trap, occurs, the trap causes these addresses to be saved to registers 65 and 66 in the integer unit 44 so that they may be recovered when the trap has been completed. When an exception occurs because of a trap generated by the floating point unit 46, the floating-point queue register 73 keeps track of the operations which are pending. The first entry in the queue 73 gives the address and the instruction that caused the exception. The remaining entries in the queue 73 contain instructions and addresses which have not been completed and must therefore be handled by the trap handler software in integer unit 44.

In the preferred embodiment, when an exception occurs, the floating point unit 46 enters an exception pending mode and remains in that mode until the integer unit 44 takes the trap signal. When this occurs, the floating point unit 46 goes into the exception mode and does no further processing until the integer unit 44 executes the exception and those instructions remaining in the floating-point queue register 73. The floating-point unit 46 looks at the first entry in the queue 73 and determines the instruction which caused the exception and its counter number. As explained, the trap base register 62 then generates the address of the particular trap handler to be utilized for the particular exception. After the exception has been emulated by the integer unit 44, it reviews each of the incomplete instructions in the queue 73 and emulates those in a similar manner (or causes them to be re-executed). When the bit in the floating-point status register 72 which indicates that the queue is empty is finally read, the integer unit 44 resumes execution of the procedure at the address indicated by the values from the program counter register 63 and the next program counter register 64 that existed and were stored in registers 65 and 66 at the time of the trap.

As explained above, the floating point unit 46 might be more generally any sort of co-processor implemented to operate with the system. The floating point unit 46 is only utilized in this case for ease of explanation.

The physical construction of the devices involved in implementing the invention is well known to the prior art. The specific details of the implementation of the system described herein and the instructions which may be utilized are set forth in *The SPARC Architecture Manual,* Version 7, Revision A, published by Sun Microsystems, Inc., 2550 Garcia Avenue, Mountain View, Calif.

Figure 4:
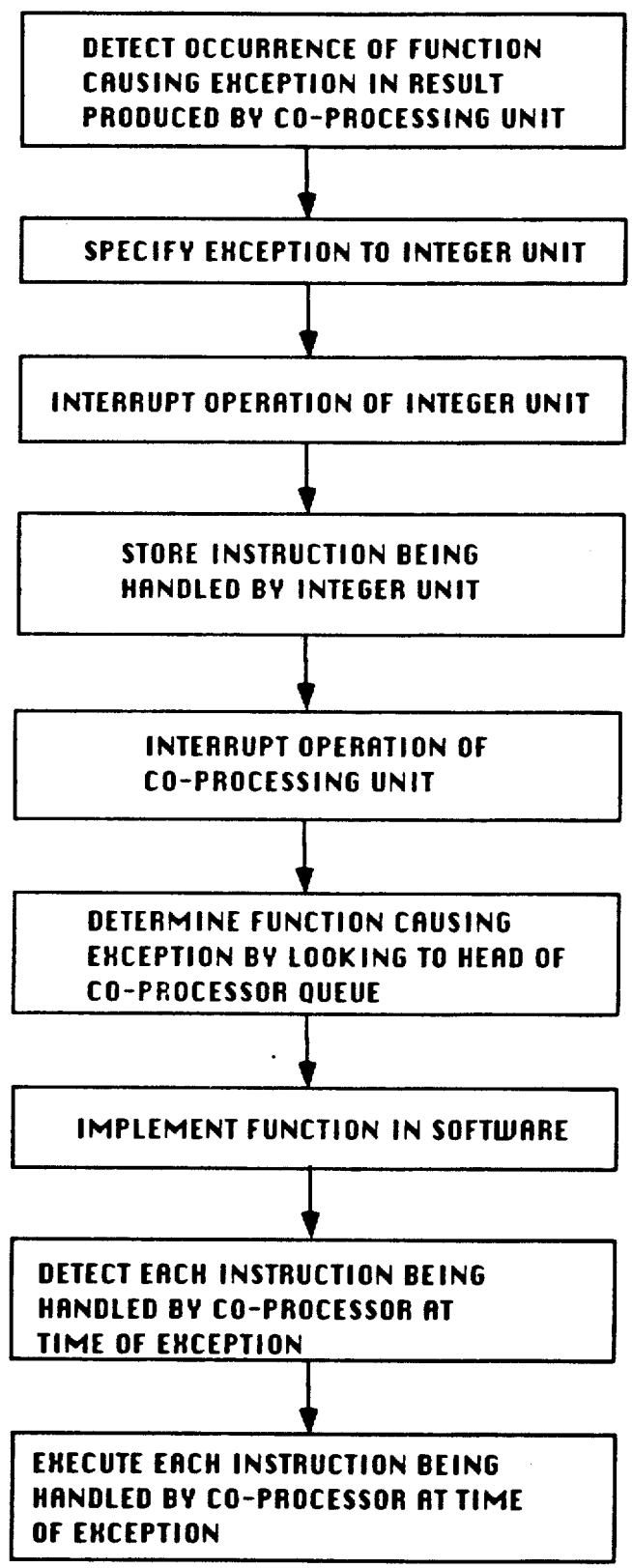
FIG. 4 is a flow chart illustrating the method of this invention.

FIG. 4 is a flow chart illustrating the method of this invention.

Although the invention has been described with reference to particular arrangements and systems, it will be apparent to those skilled in the art that the details of those arrangements and systems are used for illustrative purposes and should not be taken as limitations of the invention. It will be clear that the methods and apparatus of this invention have utility in any application where co-processors might by utilized. It is, thus, to be contemplated that many changes and modifications may be made by those of ordinary skill in the art without departing from the scope and spirit of the invention.

We claim:

1. A computer system comprising:

a central processing unit for executing a plurality of program instructions simultaneously including a first processing unit that simultaneously performs a plurality of basic processing operations and a co-processing unit which simultaneously performs and plurality of specialized processing operations concurrently with the performance of said first processing unit;

detecting means coupled to said co-processing unit for detecting the occurrence of an instruction causing an exception in a result produced by said co-processing unit, and for reporting said occurrence to said first processing unit;

storage means coupled to said first processing unit for storing the address of the instruction being executed by said first processing unit when said detecting means reports said occurrence of an instruction causing an exception: and locating mean coupled to said co-processing unit for locating and transferring to said first processing unit said instruction causing an exception and all other instructions being executed by said co-processing unit at the time said exception occurs;

said first processing unit, in the event said detecting means reports the occurrence of an instruction causing an exception in a result produced by said co-processing unit, emulates the function of said instruction causing an exception as well as the instructions being executed by said co-processing unit at the time said exception occurred, said first processing unit then continues executing said program instructions beginning with the instruction identified by said stored address.

2. The computer system of claim 1 further comprising memory means coupled to said central processing unit for storing said program instructions and for transferring said instructions to said first processing unit, said first processing unit further detecting the availability of said co-processing unit such that it said co-processing unit is present and configured said first processing unit transfers to said co-processing unit those instructions which can more efficiently by executed by said co-processing unit, and if said co-processing unit is not present or is not configured said first processing unit emulates the functions specified by said instructions which can more efficiently be executed by said co-processing unit.

3. The computer system of claim 2 wherein the operation of said first processing unit and said co-processing unit includes a first state and a second state, said first processing unit and said co-processing unit entering said second state from said first state when said detecting means detects the occurrence of an instruction causing an exception, said first processing unit performing said basic processing functions and said co-processing unit performing said specialized processing functions while in said first state, and said first processing unit and said co-processing unit halting their respective first state operations in order to process said instruction causing an exception while in said second state.

4. The computer system of claim 3 wherein said co-processing unit further comprises an instruction register for sequentially storing said instructions received from said first processing unit.

5. The computer system of claim 4 wherein said locating means detects said instruction causing an exception in a result produced by said co-processing unit by identifying the first sequentially stored instruction in said instruction register.

6. The computer system of claim 5 wherein said instruction register for sequentially storing instructions received from said first processing unit comprises an instruction register queue.

7. A method for executing a plurality of computer instructions simultaneously in a computer system having a central processing unit including a first processing unit that simultaneously performs a plurality of basic processing operations, and a co-processing unit which simultaneously performs a plurality of specialized processing operations concurrently with the performance of said first processing unit, said method comprising the steps of:

detecting the occurrence of an instruction causing an exception in a result produced by said co-processing unit;

reporting to said first processing unit said occurrence of an instruction causing an exception;

storing in storage means within said computer system the address of the instruction being executed by said first processing unit when said instruction causing an exception is detected; and locating and transferring to said first processing unit said instruction causing an exception and all other instructions being executed by said co-processing unit at the time said exception occurs;

in the event of the occurrence of an instruction causing an exception in a result produced by said co-processing unit, said first processing unit emulating the function of said instruction causing an exception as well as the function of the instructions being executed by said co-processing unit at the time said exception occurred, and then resuming program execution beginning with the instruction identified by said address previously stored in said storage means when said instruction causing an exception was detected.

8. The method as defined by claim 7 further including the steps of:

transferring to said first processing unit instructions stored in memory means within said computer system;

detecting the presence and configuration of said co-processing unit to receive said stored instructions; and transferring to said co-processing unit those instructions capable of being executed by said co-processing unit if said co-processing unit is present and configured for use, and emulating the functions specified by said instructions by said co-processing unit with said first processing unit if said co-processing unit is not present or is not configured for use.

9. The method as defined in claim 8 further including the step of sequentially storing in register means within said co-processing unit said instructions received from said first processing unit.

10. The method as defined by claim 9 wherein the step of locating said instruction causing an exception in a result produced by said co-processing unit further includes identifying the first sequentially stored instruction in said register means.

11. A method for handling co-processor exceptions in a computer system having a central processing unit including a concurrently operating first processing unit and co-processing unit which each process multiple instructions simultaneously, each said instruction including processing information indicative of which processing unit is to process each said instruction, said method comprising the steps of:

routing to said first processing unit those instructions to be executed by said first processing unit, and routing to said co-processing unit those instructions to be executed by said co-processing unit;

generating an exception signal in response to the occurrence of an instruction causing an exception in a result produced by said co-processing unit;

transferring said exception signal to said first processing unit and to said co-processing unit, said exception signal causing the respective operations of said first processing unit and said co-processing unit to halt at their current program positions;

locating and transferring to said first processing unit said instruction causing an exception and all other instructions being executed by said co-processing unit;

emulating the function of all instructions transferred by said co-processing unit to said first processing unit; and resuming the respective operations of said first processing unit and said co-processing unit at said current program positions where said respective operations were halted.

12. The method as defined by claim 11 further including the step of detecting the presence and configuration of said co-processing unit to receive instructions such that if said co-processing unit is present and configured for use those instructions to be executed by said co-processing unit are transferred to said co-processing unit, and if said co-processing unit is not present or is not configured for use all instructions are transferred to said first processing unit.

13. The method as defined in claim 12 further including the step of storing in first register means within said computer system the current program position of said first processing unit when said first processing unit receives said exception signal.

14. The method as defined by claim 13 further including the step of sequentially storing in second register means within aid computer system those instructions routed to said co-processing unit.

15. The method as defined by claim 14 wherein said step of locating and transferring to said first processing unit said instruction causing an exception further includes the step of identifying the first instruction in said second register means.

* * * * *